United States Patent
Shibata et al.

(10) Patent No.: US 6,547,147 B1
(45) Date of Patent: Apr. 15, 2003

(54) PORTABLE OPTICAL INFORMATION READING APPARATUS

(75) Inventors: Yoshimitsu Shibata, Okazaki (JP); Yoshirou Asai, Kariya (JP)

(73) Assignee: Denso Corporation, Kariya (JP)

( * ) Notice: Subject to any disclaimer, the term of this patent is extended or adjusted under 35 U.S.C. 154(b) by 0 days.

(21) Appl. No.: 09/505,957

(22) Filed: Feb. 17, 2000

(30) Foreign Application Priority Data

Feb. 17, 1999 (JP) .......................................... 11-038556
Sep. 8, 1999 (JP) .......................................... 11-254260

(51) Int. Cl.$^7$ ................................................ G06K 7/10
(52) U.S. Cl. ......................... 235/472.01; 235/462.45; 235/462.46; 235/472.03
(58) Field of Search ...................... 235/472.01, 462.46, 235/462.45, 472.03

(56) References Cited

U.S. PATENT DOCUMENTS

| | | | | |
|---|---|---|---|---|
| 4,841,132 A | * | 6/1989 | Kajitani et al. | 235/375 |
| 4,916,441 A | | 4/1990 | Gombrich | 346/712 |
| 5,241,508 A | * | 8/1993 | Berenguel et al. | 365/229 |
| 5,515,303 A | | 5/1996 | Cargin, Jr. et al. | 364/708.1 |
| 5,519,663 A | * | 5/1996 | Harper, Jr. et al. | 365/229 |
| 5,659,761 A | * | 8/1997 | DeArras et al. | 713/300 |
| 5,793,967 A | * | 8/1998 | Simciak et al. | 709/204 |
| 5,799,200 A | * | 8/1998 | Brant et al. | 395/750.08 |
| 5,866,023 A | * | 2/1999 | Monson | 235/383 |
| 6,193,161 B1 | * | 2/2001 | Sojka et al. | 235/472.01 |

FOREIGN PATENT DOCUMENTS

JP            6-259338            9/1994

* cited by examiner

Primary Examiner—Michael G. Lee
Assistant Examiner—Seung Ho Lee
(74) Attorney, Agent, or Firm—Harness, Dickey & Pierce, PLC

(57) ABSTRACT

An optical information reading apparatus of a portable type includes a reading device for reading optical information and converting the optical information into electric information. A volatile memory device operates for storing the electric information generated by the reading device. A first power supply operates for feeding electric power to at least the reading device and a volatile memory device. A changing device operates for replacing the first power supply by a second power supply and enabling the second power supply to feed electric power to at least the volatile memory device instead of the first power supply in cases where electric power feed by the first power supply is required to be cut off. A writing device operates for transferring the electric information from the volatile memory device to the nonvolatile memory device, and writing the electric information into the nonvolatile memory device when a predetermined time has elapsed since a moment at which the electric power feed by the first power supply is required to be cut off. The changing device replaces the second power supply by the first power supply and enables the first power supply to feed electric power to at least the volatile memory device instead of the second power supply before the writing device transfers the electric information from the volatile memory device to the nonvolatile memory device and writes the electric information into the nonvolatile memory device. The first power supply feeds electric power to the writing device and the nonvolatile memory device.

7 Claims, 5 Drawing Sheets

PORTABLE OPTICAL INFORMATION READING APPARATUS

BACKGROUND OF THE INVENTION

1. Field of the Invention

This invention relates to an optical information reading apparatus of a portable or hand-held type.

2. Description of the Related Art

Optical information reading apparatuses of a portable type include bar-code readers and bar-code handy terminals. A prior-art bar-code handy terminal has an internal RAM. The bar-code handy terminal reads out data from a bar code, and stores the read-out data into the RAM. The bar-code handy terminal transmits the data from the RAM to a host apparatus by radio communication or optical communication. During operation of the bar-code handy terminal, data is frequently written into and read out from the RAM. The reason why the RAM is used in the bar-code handy terminal is that the RAM is suited for a memory frequently accessed. The RAM is enabled to continuously hold data therein by continuous feed of electric power thereto. The continuous power feed to the RAM causes an increased rate of power consumed by the bar-code handy terminal.

A prior-art advanced bar-code reader includes a nonvolatile memory in addition to a RAM. The nonvolatile memory is a flash memory. In the advanced bar-code reader, when a power supply switch is changed to an off position, data is transferred from the RAM to the flash memory and is saved therein and then power feed to the RAM is cut off. Data can be written into the flash memory a number of times, the upper limit of which is relatively low. Accordingly, the flash memory has a problem in its life.

Japanese published unexamined patent application 6-259338 discloses a system including a main memory, a nonvolatile memory, a backup battery, and a timer. When main power supply is cut off, the backup battery is used instead thereof. Then, the main memory continues to be fed with power from the backup battery so that the main memory continuously holds data therein. When a predetermined time given by the timer has elapsed from the moment of the cutoff of the main power supply, the data is transferred from the main memory to the nonvolatile memory and is saved therein. According to the system of Japanese patent application 6-259338, it is possible to reduce the number of times data is written into the nonvolatile memory. In the system of Japanese patent application 6-259338, power from the backup battery is used for the transfer of data from the main memory to the nonvolatile memory and also the activation of the nonvolatile memory. Thus, the backup battery tends to be great in capacity and size.

SUMMARY OF THE INVENTION

It is an object of this invention to provide a small-sized optical information reading apparatus of a portable or hand-held type.

A first aspect of this invention provides an optical information reading apparatus of a portable type. The optical information reading apparatus comprises reading means for reading optical information and converting the optical information into electric information; volatile memory means for storing the electric information generated by the reading means; nonvolatile memory means; a first power supply for feeding electric power to at least the reading means and the volatile memory means; a second power supply; changing means for replacing the first power supply by the second power supply and enabling the second power supply to feed electric power to at least the volatile memory means instead of the first power supply in cases where electric power feed by the first power supply is required to be cut off; and writing means for transferring the electric information from the volatile memory means to the nonvolatile memory means, and writing the electric information into the nonvolatile memory means when a predetermined time has elapsed since a moment at which the electric power feed by the first power supply is required to be cut off; wherein the changing means replaces the second power supply by the first power supply and enables the first power supply to feed electric power to at least the volatile memory means instead of the second power supply before the writing means transfers the electric information from the volatile memory means to the nonvolatile memory means and writes the electric information into the nonvolatile memory means, and wherein the first power supply feeds electric power to the writing means and the nonvolatile memory means.

A second aspect of this invention is based on the first aspect thereof, and provides an optical information reading apparatus further comprising means for inhibiting electric power feed by the second power supply after the writing means transfers the electric information from the volatile memory means to the nonvolatile memory means and writes the electric information into the nonvolatile memory means.

A third aspect of this invention is based on the first aspect thereof, and provides an optical information reading apparatus further comprising means for transferring the electric information from the nonvolatile memory means to the volatile memory means in cases where electric power feed by the first power supply is restarted after the writing means transfers the electric information from the volatile memory means to the nonvolatile memory means and writes the electric information into the nonvolatile memory means.

A fourth aspect of this invention provides an optical information reading apparatus of a portable type. The optical information reading apparatus comprises a volatile memory; a nonvolatile memory; a main power supply; an auxiliary power supply; first means for enabling the main power supply to activate the volatile memory; second means for storing data into the volatile memory; third means for enabling the auxiliary power supply to activate the volatile memory instead of the main power supply when activation of the volatile memory by the main power supply is required to be suspended; fourth means for enabling the main power supply to activate the volatile memory instead of the auxiliary power supply when a predetermined time has elapsed since a moment at which the third means enables the auxiliary power supply to activate the volatile memory instead of the main power supply; and fifth means for transferring the data from the volatile memory to the nonvolatile memory after the fourth means enables the main power supply to activate the volatile memory instead of the auxiliary power supply.

DESCRIPTION OF THE PREFERRED EMBODIMENT

Figure 1:
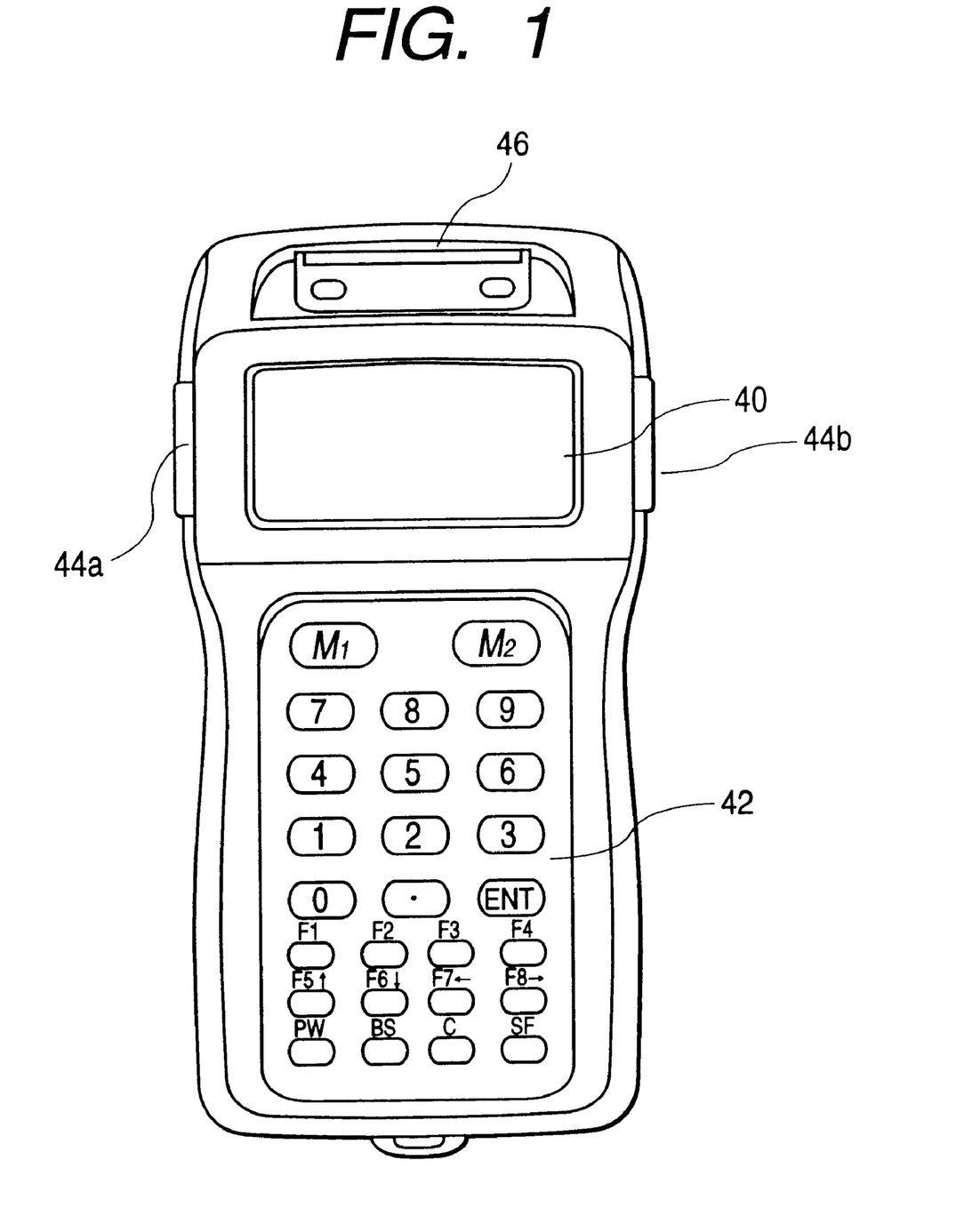
FIG. 1 is a perspective view of an optical information reading apparatus of a portable or hand-held type according to an embodiment of this invention.
Figure 2:
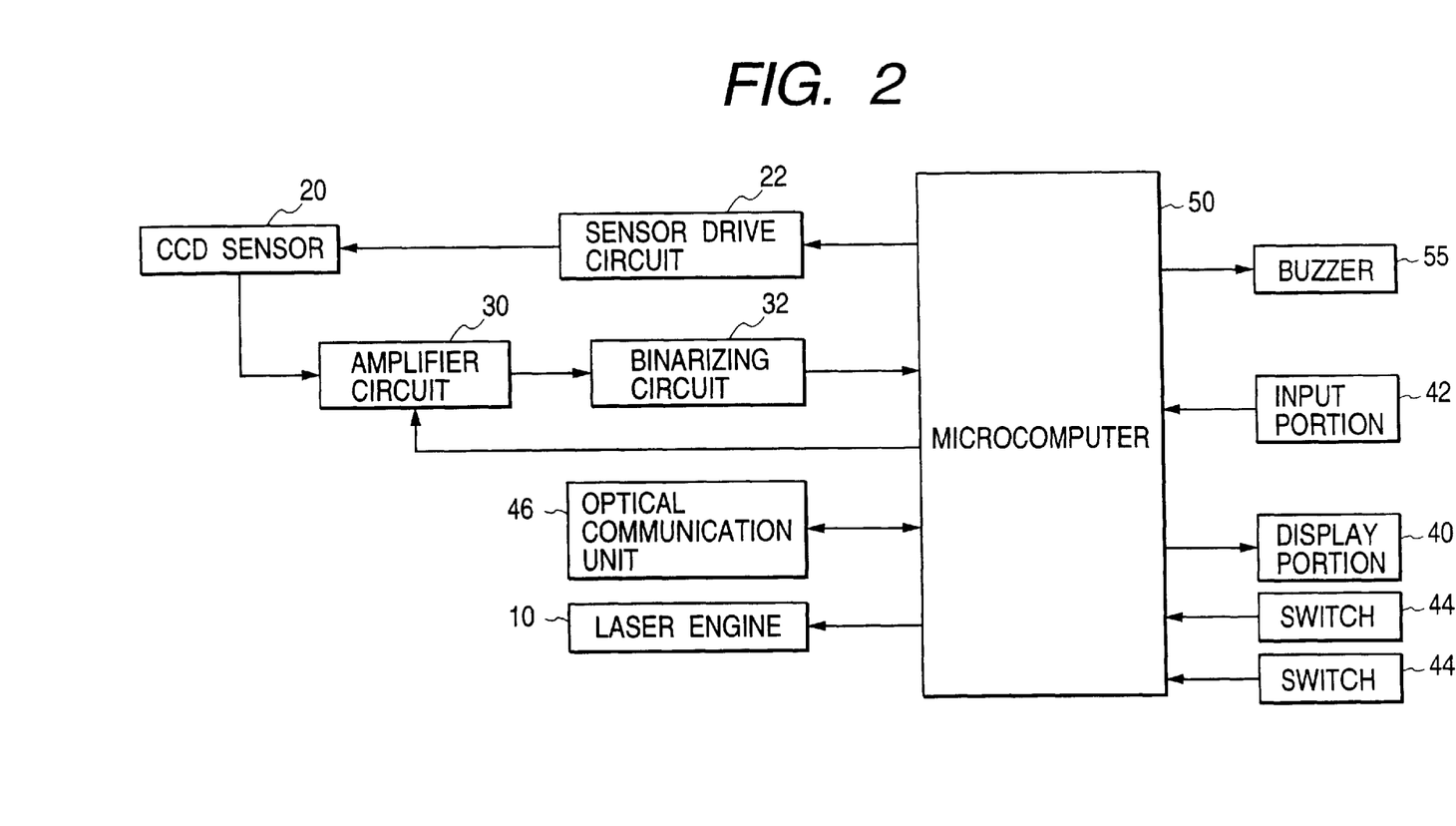
FIG. 2 is a block diagram of the optical information reading apparatus in FIG. 1.

With reference to FIGS. 1 and 2, an optical information reading apparatus of a portable or hand-held type includes a display portion 40, an input portion 42, switches 44a and 44b, and an optical communication unit 46. The display portion 40 indicates operating conditions of the optical information reading apparatus. Various information pieces can be inputted into the optical information reading apparatus by actuating the input portion 42. In addition, a command or commands such as a data outputting command may be inputted into the optical information reading apparatus by actuating the input portion 42. The switches 44a and 44b are used as trigger switches for generating trigger signals including a read command.

The optical information reading apparatus further contains a laser engine 10, a CCD image sensor 20, a sensor drive circuit 22, an amplifier circuit 30, a binarizing circuit 32, a microcomputer 50, and a buzzer 55. The laser engine 10 includes a laser light source and a scanning mechanism. The laser light source applies a laser beam to a target area containing an object code such as a bar code or a two-dimensional code. The scanning mechanism enables the target area to be scanned by the laser beam. The buzzer 55 can generate a sound signal representing a success in reading out information from the object code, and a sound signal representing a given warning. The CCD image sensor 20 and the microcomputer 50 correspond to a reading means.

As shown in FIG. 2, the microcomputer 50 is connected to the laser engine 10, the sensor drive circuit 22, the amplifier circuit 30, the binarizing circuit 32, the display portion 40, the input portion 42, the switches 44a and 44b, the optical communication unit 46, and the buzzer 55. The sensor drive circuit 22 is connected to the CCD image sensor 20. The amplifier circuit 30 is connected to the CCD image sensor 20 and the binarizing circuit 32.

The microcomputer 50 is programmed to control the laser engine 10, the sensor drive circuit 22, the amplifier circuit 30, the display portion 40, the optical communication unit 46, and the buzzer 55 in response to signals fed from the binarizing circuit 32, the input portion 42, the switches 44a and 44b, and the optical communication unit 46.

When one of the switches 44a and 44b is depressed by a user, the depressed switch outputs a read command to the microcomputer 50. The microcomputer 50 controls the laser engine 10 in response to the read command to start and execute an information reading process. Specifically, during the execution of the information reading process, the laser engine 10 emits a laser beam, and a target area containing an object code (for example, a bar code or a two-dimensional code) is scanned by the laser beam. The laser beam is reflected at the target area, and a portion of the reflected laser beam travels back to the optical information reading apparatus as a return light beam. The optical information reading apparatus includes a mirror and a lens which are not shown in the drawings. The mirror reflects the return light beam toward the lens. The lens focuses the return light beam on a surface of the CCD image sensor 20. The lens acts to form an image of the target area containing the object code on the surface of the CCD image sensor 20. The CCD image sensor 20 changes the image into a corresponding electric signal through a photoelectric conversion process. The CCD image sensor 20 outputs the electric signal to the amplifier circuit 30. The amplifier circuit 30 enlarges the electric signal at a gain controlled by the microcomputer 50. The amplifier circuit 30 outputs the resultant signal to the binarizing circuit 32. The binarizing circuit 32 converts the output signal of the amplifier circuit 30 into a binary signal. The binarizing circuit 32 outputs the binary signal to the microcomputer 50. The microcomputer 50 processes the output signal of the binarizing circuit 32 to recover data represented by the object code.

Figure 3:
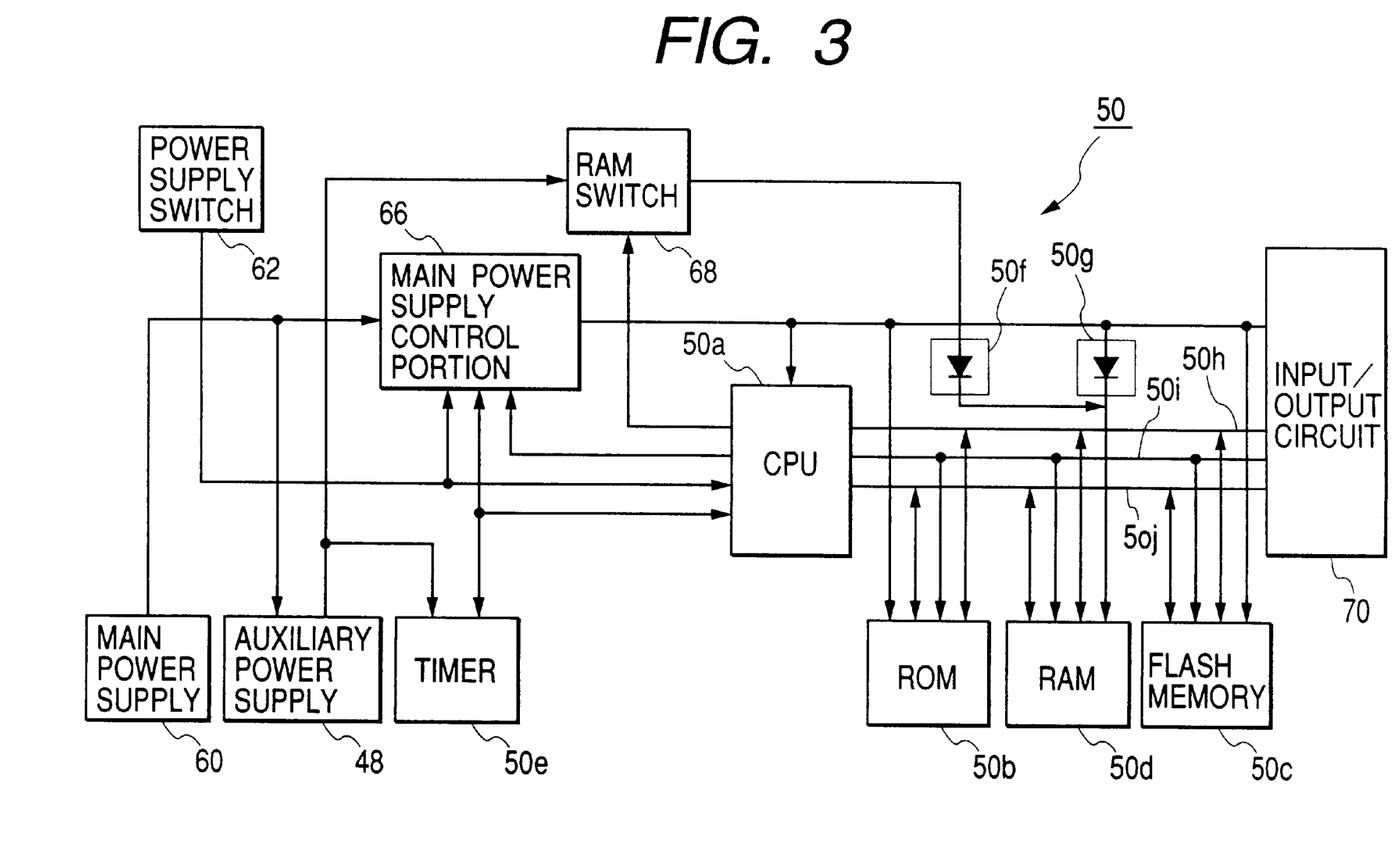
FIG. 3 is a block diagram of a portion of the optical information reading apparatus in FIG. 1.

As shown in FIG. 3, the microcomputer 50 includes a CPU 50a, a ROM 50b, a flash memory (a nonvolatile memory) 50c, a RAM (a volatile memory) 50d, a timer 50e, diodes 50f and 50g, a data line 50h, an address line 50i, a bus control line 50j, and an input/output circuit 70. The CPU 50a is connected to the ROM 50b, the flash memory 50c, the RAM 50d, and the input/output circuit 70 via the data line 50h, the address line 50i, and the bus control line 50j. The input/output circuit 70 forms interfaces with the laser engine 10, the sensor drive circuit 22, the amplifier circuit 30, the binarizing circuit 32, the display portion 40, the input portion 42, the optical communication unit 46, and the buzzer 55 (see FIG. 2). The CPU 50a, the ROM 50b, the flash memory 50c, and the input/output circuit 70 are connected to a main power supply control portion 66. The RAM 50d is connected via the diode 50g to the main power supply control portion 66. The main power supply control portion 66 is connected to a main power supply 60. The CPU 50a, the ROM 50b, the flash memory 50c, and the input/output circuit 70 are fed with electric power from the main power supply 60 via the main power supply control portion 66. The RAM 50d is fed with electric power from the main power supply 60 via the main power supply control portion 66 and the diode 50g.

The CPU 50a corresponds to a writing means. The RAM 50d corresponds to a first memory means. The flash memory 50c corresponds to a second memory means. The main power supply 60 corresponds to a first power supply. The CPU 50a, the timer 50e, and the diodes 50f and 50g correspond to a changing means.

The CPU 50a operates in accordance with a control program stored in the ROM 50b. The CPU 50a recovers data represented by an object code (for example, a bar code or a two-dimensional code). The CPU 50a stores the recovered object-code data in the RAM 50d. When the power feed from the main power supply 60 is cut off, the CPU 50a transfers the object-code data from the RAM 50d to the flash memory 50c to save the object-code data in the flash memory 50c.

An auxiliary power supply 48 is connected to the main power supply 60. The auxiliary power supply 48 can be charged by electric power fed from the main power supply 60. The auxiliary power supply 48 is connected to the RAM 50d via a RAM switch 68 and the diode 50f. The RAM switch 68 has a control terminal connected to the CPU 50a. The RAM switch 68 is changed between an on state and an off state by the CPU 50a. When the RAM switch 68 is in its on state, the following processes occur. In the case where the voltage across the main power supply 60 is higher than the voltage across the auxiliary power supply 48, electric power is fed from the main power supply 60 to the auxiliary power supply 48 as a charging current while a portion of the electric power further travels from the auxiliary power supply 48 to the RAM 50d via the RAM switch 68 and the diode 50f. In the case where the voltage across the main power supply 60 is lower than the voltage across the auxiliary power supply 48, electric power travels from the auxiliary power supply 48 to the RAM 50d via the RAM switch 68 and the diode 50f. The auxiliary power supply 48 and the main power supply 60 correspond to a second power supply.

The timer 50e is connected to the auxiliary power supply 48, the CPU 50a, and the main power supply control portion 66. The timer 50e is fed with electric power from the auxiliary power supply 48. The timer 50e is controlled by the CPU 50a. Specifically, the timer 50e is started by the CPU 50a. The timer 50e generates time information, and outputs the time information to the CPU 50a and the main power supply control portion 66. The time information includes a start signal.

The RAM switch 68 is normally in its on state. When the RAM switch 68 is in its on state, the power feed from the auxiliary power supply 48 to the RAM 50d can be implemented. When the RAM switch 68 is changed to its off state, the power feed from the auxiliary power supply 48 to the RAM 50d is interrupted or inhibited.

A power supply switch 62 is connected to the CPU 50a and the main power supply control portion 66. The main power supply control portion 66 is connected to the CPU 50a. When the power supply switch 62 is actuated by the user, the device 62 generates an off command to execute the power feed from the main power supply 60 via the main power supply control portion 66 or an off command to cut off the power feed from the main power supply 60 via the main power supply control portion 66. The on command and the off command are transmitted from the power supply switch 62 to the CPU 50a and the main power supply control portion 66.

A first power feed line extends from the main power supply 60 to the RAM 50d via the main power supply control portion 66 and the diode 50g. Along the first power feed line, electric power can be fed from the main power supply 60 to the RAM 50d. A second power feed line extends from the auxiliary power supply 48 to the RAM 50d via the RAM switch 68 and the diode 50f. Along the second power feed line, electric power can be fed from the auxiliary power supply 48 to the RAM 50d. One of the power feed to the RAM 50d via the diode 50g and the power feed to the RAM 50d via the diode 50f is selectively implemented. Specifically, when the voltage at the input side of the diode 50g is higher than the voltage at the input side of the diode 50f, the power feed to the RAM 50d via the diode 50g is implemented. When the voltage at the input side of the diode 50g is lower than the voltage at the input side of the diode 50f, the power feed to the RAM 50d via the diode 50f is implemented.

The main power supply control portion 66 receives an input voltage from the main power supply 60. The main power supply control portion 66 derives an output voltage from the input voltage. The main power supply control portion 66 includes a voltage controller which regulates the output voltage at a first predetermined level, for example, 3.3 V. The main power supply control portion 66 applies the output voltage to the input side of the diode 50g. The main power supply control portion 66 is connected to the CPU 50a. The main power supply control portion 66 is changed between an on state and an off state (a sleep state) by the CPU 50a.

The RAM switch 68 receives an input voltage from the auxiliary power supply 48. The RAM switch 68 derives an output voltage from the input voltage. The RAM switch 68 includes a voltage controller which regulates the output voltage at a second predetermined level lower than the first predetermined level. The second predetermined level is equal to, for example, about 2 V. The RAM switch 68 applies the output voltage to the input side of the diode 50f.

In the case where the main power supply control portion 66 is in its on state, the voltage at the input side of the diode 50g is higher than the voltage at the input side of the diode 50f so that electric power is fed from the main power supply 60 to the RAM 50d via the main power supply control portion 66 and the diode 50g. In the case where the power feed from the main power supply 60 via the main power supply control portion 66 is cut off, electric power is fed from the auxiliary power supply 48 to the RAM 50d via the RAM switch 68 and the diode 50f.

The voltage controller in the main power supply control portion 66 has a voltage boosting function. Accordingly, in the case where the main power supply control portion 66 is in its on state, even when the voltage across the main power supply 60 drops below the voltage across the auxiliary power supply 48, the voltage at the input side of the diode 50g is maintained at the first predetermined level so that electric power is fed from the main power supply 60 to the RAM 50d via the main power supply control portion 66 and the diode 50g.

When the optical information reading apparatus is inactive, the main power supply control portion 66 is in its sleep state (its off state). The main power supply control portion 66 is changed from its sleep state to its on state by a start signal outputted from the timer 50e. Also, the main power supply control portion 66 is changed from its sleep state to its on state by an on command transmitted from the power supply switch 62. Upon the change of the main power supply control portion 66 to its on state, electric power starts to be fed from the main power supply 60 to the CPU 50a, the ROM 50b, the flash memory 50c, the RAM 50d, and the input/output circuit 70 via the main power supply control portion 66.

Figure 4:
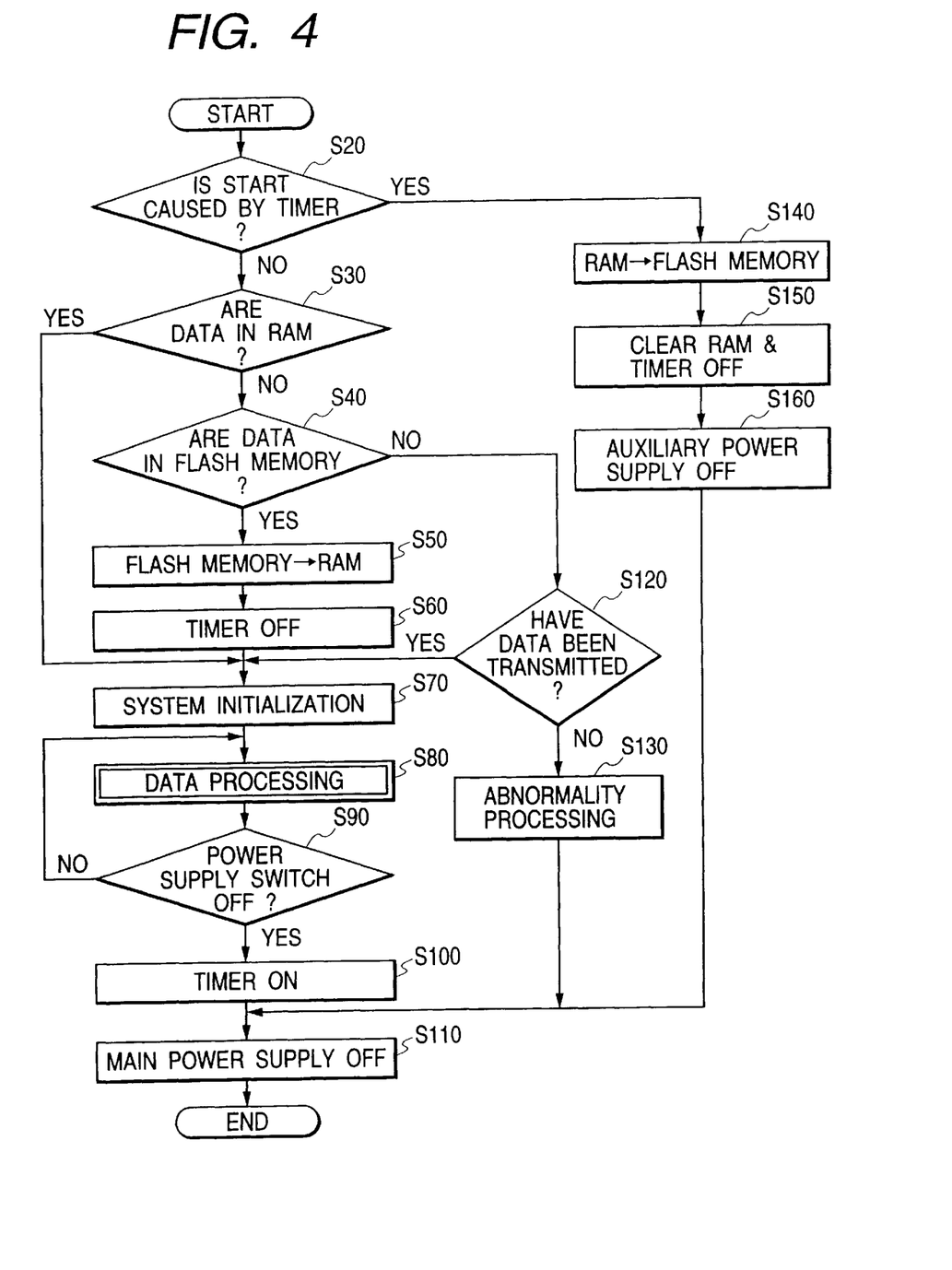
FIG. 4 is a flowchart of a control program for a CPU in FIG. 3.

As previously mentioned, the CPU 50a operates in accordance with a control program stored in the ROM 50b. FIG. 4 is a flowchart of the control program. The control program in FIG. 4 is started when the CPU 50a is fed with electric power from the main power supply 60 via the main power supply control portion 66.

With reference to FIG. 4, a first step S20 of the program determines whether or not the present start is caused by a start signal from the timer 50e. When it is determined that the present start is caused by a start signal from the timer 50e, the program advances from the step S20 to a step S140. On the other hand, when it is determined that the present start is not caused by a start signal from the timer 50e, the program advances from the step S20 to a step S30. In the case where the present start is caused by an on command from the power supply switch 62, the program advances from the step S20 to the step S30.

The step S30 determines whether or not data recovered from an object code are in the RAM 50d. Data recovered from an object code are also referred to as object-code data. When it is determined that object-code data are in the RAM 50d, the program advances from the step S30 to a step S70. On the other hand, it is determined that object-code data are not in the RAM 50d, the program advances from the step S30 to a step S40.

During the normal operation of the optical information reading apparatus except for a moment immediately after object-code data have been transmitted from the RAM 50d to a host apparatus (not shown), object-code data are in the RAM 50d so that the program advances from the step S30 to the step S70.

The step S70 initializes a system (a data processing system) of the optical information reading apparatus. Specifically, the step S70 opens input/output ports with the display portion 40 and the input portion 42. In addition, the step S70 sets and initializes various control parameters and variables. After the step S70, the program advances to a data processing block S80. The data processing block S80 will be explained in detail later. After the data processing block S80, the program advances to a step S90.

The step S90 determines whether or not an off command is outputted from the power supply switch 62, that is, whether or not the power feed from the main power supply 60 via the main power supply control portion 66 is required to be cut off. When it is determined that an off command is outputted from the power supply switch 62 (that is, when it is determined that the power feed from the main power supply 60 via the main power supply control portion 66 is required to be cut off), the program advances from the step S90 to a step S100. On the other hand, when it is determined that an off command is not outputted from the power supply switch 62 (that is, when it is determined that the power feed from the main power supply 60 via the main power supply control portion 66 is not required to be cut off), the program returns from step S90 to the data processing block S80. Accordingly, the data processing block S80 continues to be repetitively executed until an off command is outputted from the power supply switch 62.

The step S100 starts the timer 50e. Specifically, the step S100 changes the timer 50e from an off state to an on state. After the step S100, the program advances to a step S110.

When a predetermined time interval, for example, 1 hour, has elapsed since the moment of the change of the timer 50e from its off state to its on state, the timer 50e outputs a start signal to the main power supply control portion 66. Here, the predetermined time interval is given by the timer 50e. The main power supply control portion 66 is changed from its sleep state (its off state) to its on state by the start signal outputted from the timer 50e.

The step S110 outputs a cutoff signal to the main power supply control portion 66. The main power supply control portion 66 changes from its on state to its sleep state (its off state) in response to the cutoff signal so that the power feed from the main power supply 60 is interrupted or cut off. After the step S110, the current execution cycle of the program ends.

As previously mentioned, when the step S30 determines that object-code data are not in the RAM 50d, the program advances from the step S30 to a step S40.

The step S40 determines whether or not object-code data (data recovered from an object code) are in the flash memory 50c. When it is determined that object-code data are in the flash memory 50c, the program advances from the step S40 to a step S50. On the other hand, it is determined that object-code data are not in the flash memory 50c, the program advances from the step S40 to a step S120.

The step S50 transfers the object-code data from the flash memory 50c to the RAM 50d. The step S50 stores the object-code data into the RAM 50d. In addition, the step S50 clears the object-code data from the flash memory 50c.

A step S60 following the step S50 changes the timer 50e from its on state to its off state. After the step S60, the program advances to the step S70.

The step S120 determines whether or not object-code data have been transmitted to the host apparatus. When it is determined that object-code data have been transmitted to the host apparatus, the program advances from the step S120 to the step S70. On the other hand, when it is determined that object-code data have not been transmitted to the host apparatus, the program advances from the step S120 to a step S130.

The step S130 implements a process of informing the user that an abnormal condition occurs. For example, the step S130 activates the buzzer 55 and thereby audibly informs the user that an abnormal condition occurs. The step S130 may control the display portion 40 to indicate the occurrence of an abnormal condition. After the step S130, the program advances to the step S110 which executes the process of cutting off the power feed from the main power supply 60. Then, the current execution cycle of the program ends.

As previously mentioned, when the step S20 determines that the present start is caused by a start signal from the timer 50e, the program advances from the step S20 to a step S140.

The step S140 transfers object-code data from the RAM 50d to the flash memory 50c. The step S140 writes the object-code data into the flash memory 50c. Thus, the step S140 saves the object-code data in the flash memory 50c.

A step S150 following the step S140 clears all data from the RAM 50d. In addition, the step S150 changes the timer 50e from its on state to its off state.

A step S160 subsequent to the step S150 changes the RAM switch 68 from its on state to its off state. When the RAM switch 68 is changed to its off state, the power feed from the auxiliary power supply 48 to the RAM 50d is inhibited. After the step S160, the program advances to the step S110 which executes the process of cutting off the power feed from the main power supply 60. Then, the current execution cycle of the program ends.

Figure 5:
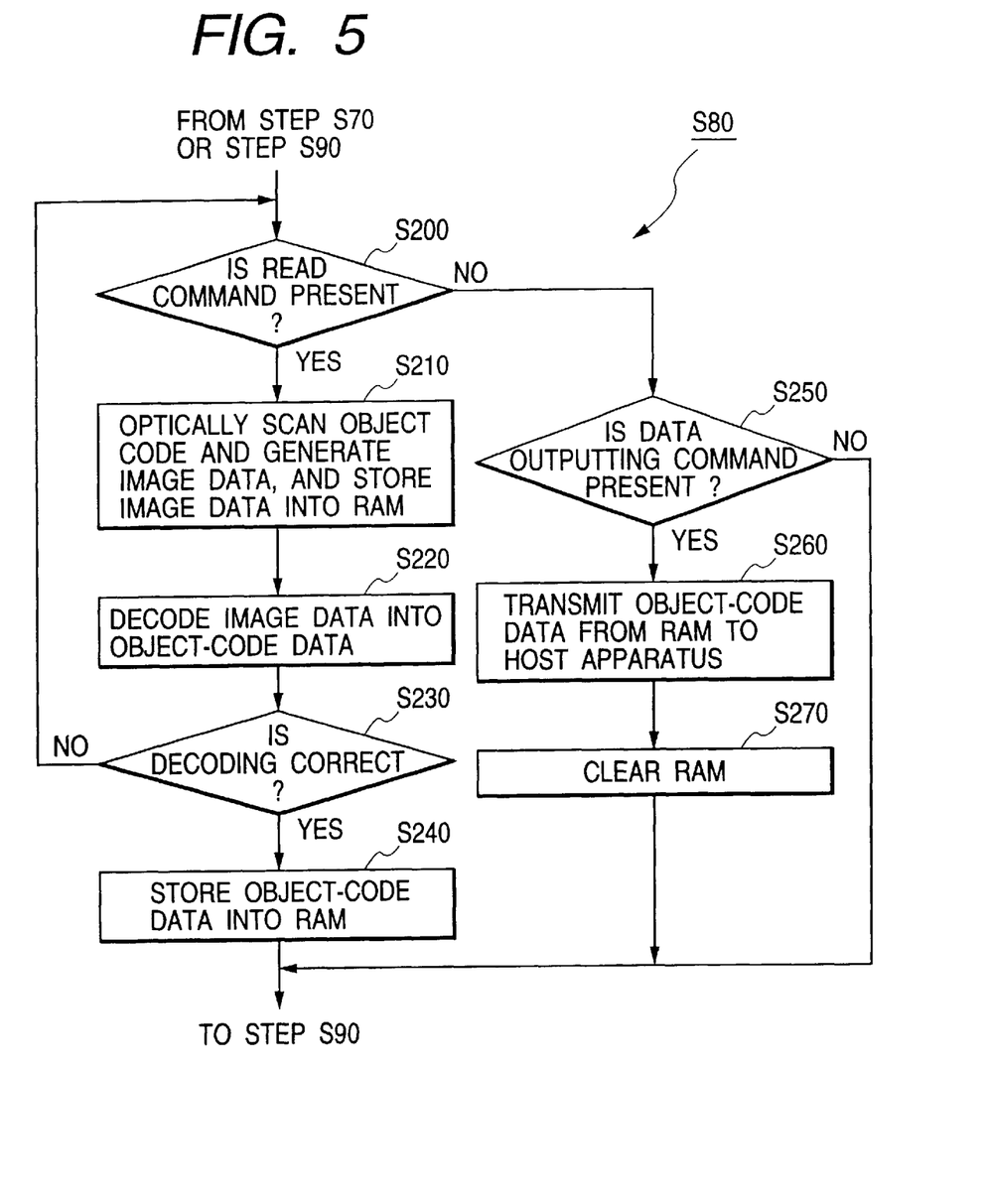
FIG. 5 is a flowchart of the details of a block in FIG. 4.

With reference to FIG. 5, the data processing block S80 will be explained in detail. The data processing block S80 has a first step S200 which follows the step S70 or the step S90 (see FIG. 4). The step S200 determines whether or not a read command is present. Generally, a read command is generated in accordance with user's request. Specifically, the step S200 determines whether or not one of the switches 44a and 44b is depressed. When it is determined that one of the switches 44a and 44b is depressed (that is, when it is determined that a read command is present), the program advances from the step S200 to a step S210. Otherwise, the program advances from the step S200 to a step S250.

The step S210 controls the laser engine 10 to start and execute the previously-mentioned information reading process. Specifically, during the execution of the information reading process, a target area containing an object code (for example, a bar code or a two-dimensional code) is scanned by the laser beam emitted by the laser engine 10. The binarizing circuit 32 outputs a binary signal representing an image of the target area containing the object code. The step S210 stores the output signal of the binarizing circuit 32 into the RAM 50d. The stored output signal of the binarizing circuit 32 is also referred to as the input image data.

A step S220 following the step S210 accesses the input image data in the RAM 50d, and decodes the input image data into original data represented by the object code in accordance with predetermined decoding information stored in the ROM 50b. Thus, the original data are recovered from the object code. The recovered original data are also referred to as the object-code data.

A step S230 subsequent to the step S220 determines whether or not the input image data have been correctly decoded. When it is determined that the input image data have been correctly decoded, the program advances from the step S230 to a step S240. On the other hand, when it is determined that the input image data have not been correctly decoded, the program returns from the step S230 to the step S200.

The step S240 stores the recovered data (the object-code data) into the RAM 50d. In addition, the step S240 activates the buzzer 55 and thereby audibly informs the user that information has been successfully read out from the object code. After the step S240, the program exits from the data processing bock S80 and then advances to the step S90 in FIG. 4.

The step S250 determines whether or not a data outputting command is present. A data outputting command can be inputted via the input portion 42. A data outputting command requires the transmission of object-code data from the RAM 50d to the host apparatus via the optical communication unit 46. When it is determined that a data outputting command is present, the program advances from the step S250 to a step S260. Otherwise, the program advances from the step S250 and exits from the data processing block S80. Then, the program advances to the step S90 in FIG. 4.

The step S260 transmits the object-code data from the RAM 50d to the host apparatus via the optical communication unit 46. A step S270 subsequent to the step S260 clears the object-code data from the RAM 50d. After the step S270, the program exits from the data processing block S80 and then advances to the step S90 in FIG. 4.

Operation of the optical information reading apparatus will be further explained hereinafter. Operation of the optical information reading apparatus is changed among different modes including a mode ①, a mode ②, and a mode ③. The operation mode ① relates to an information reading and data outputting process. The operation mode ② relates to a data saving process. The operation mode ③ relates a process of starting the power feed from the main power supply 60 via the main power supply control portion 66 after the data saving process has been completed in the operation mode ②.

Mode ① (Information Reading and Data Outputting Process)

When the program is started, the step S20 is executed. Regarding the operation mode ①, the present start is caused by an on command from the power supply switch 62. Thus, the step S20 determines that the present start is not caused by a start signal from the timer 50e. Therefore, the program advances from the step S20 to the step S30.

During the normal operation of the optical information reading apparatus except for a moment immediately after object-code data have been transmitted from the RAM 50d to the host apparatus, object-code data are in the RAM 50d. Thus, the step S30 determines that data recovered from an object code are in the RAM 50d. Therefore, the program advances from the step S30 to the step S70.

The step S70 initializes the system (the data processing system) of the optical information reading apparatus. After the step S70, the program advances to the data processing block S80.

The step S200 in the data processing block S80 determines whether or not a read command is present. When it is determined that a read command is present, the program advances from the step S200 to the step S210. Otherwise, the program advances from the step S200 to the step S250.

The step S210 controls the laser engine 10 to start and execute the previously-mentioned information reading process. Specifically, during the execution of the information reading process, a target area containing an object code (for example, a bar code or a two-dimensional code) is scanned by the laser beam emitted by the laser engine 10. The binarizing circuit 32 outputs a binary signal representing an image of the target area containing the object code. The step S210 stores the output signal of the binarizing circuit 32 into the RAM 50d. The stored output signal of the binarizing circuit 32 is also referred to as the input image data.

The step S220 which follows the step S210 decodes the input image data into original data represented by the object code. Thus, the original data are recovered from the object code. The recovered original data are also referred to as the object-code data.

The step S230 which is subsequent to the step S220 determines whether or not the input image data have been correctly decoded. When it is determined that the input image data have been correctly decoded, the program advances from the step S230 to the step S240. On the other hand, when it is determined that the input image data have not been correctly decoded, the program returns from the step S230 to the step S200.

The step S240 stores the recovered data (the object-code data) into the RAM 50d. In addition, the step S240 activates the buzzer 55 and thereby audibly informs the user that information has been successfully read out from the object code. After the step S240, the program exits from the data processing bock S80 and then advances to the step S90.

The step S250 determines whether or not a data outputting command is present. When it is determined that a data outputting command is present, the program advances from the step S250 to the step S260. Otherwise, the program advances from the step S250 to the step S90.

The step S260 transmits the object-code data from the RAM 50d to the host apparatus via the optical communication unit 46. The step S270 which follows the step S260 clears the object-code data from the RAM 50d. After the step S270, the program advances to the step S90.

The step S90 determines whether or not an off command is outputted from the power supply switch 62. When it is determined that an off command is outputted from the power supply switch 62, the program advances from the step S90 to the step S100. On the other hand, when it is determined that an off command is not outputted from the power supply switch 62, the program returns from step S90 to the data processing block S80. Accordingly, the data processing block S80 continues to be repetitively executed until an off command is outputted from the power supply switch 62.

The step S100 changes the timer 50e from its off state to its on state. After the step S100, the program advances to the step S110.

When a predetermined time interval, for example, 1 hour, has elapsed since the moment of the change of the timer 50e from its off state to its on state, the timer 50e outputs a start signal to the main power supply control portion 66. Here, the predetermined time interval is given by the timer 50e. The main power supply control portion 66 is changed from its sleep state (its off state) to its on state by the start signal outputted from the timer 50e.

The step S110 outputs a cutoff signal to the main power supply control portion 66. The main power supply control portion 66 changes from its on state to its sleep state (its off state) in response to the cutoff signal so that the power feed from the main power supply 60 is interrupted or cut off. After the step S110, the execution of the program ends.

Mode ② (Data Saving Process)

When the user actuates the power supply switch 62 to input an off command into the optical information reading apparatus, the step S100 changes the timer 50e from its off state to its on state in response to the off command. Then, the step S100, changes the main power supply control portion 66 from its on state to its sleep state (its off state) to cut off the power feed from the main power supply 60. Then, the execution of the program ends. The power feed cutoff deactivates the CPU 50a and the ROM 50b. The power feed from the main power supply 60 via the main power supply control portion 66 continues to be cut off until the predetermined time interval which is given by the timer 50e has elapsed since the moment of the change of the timer 50e from its off state to its on state. Since the RAM switch 68 is normally in its on state, the auxiliary power supply 48 maintains power feed to the RAM 50d via the RAM switch 68 although the power feed from the main power supply 60 via the main power supply control portion 66 continues to be cut off. Accordingly, the RAM 50d remains activated, and continues to hold data. In this way, the RAM 50d is backed up by the auxiliary power supply 48.

When the predetermined time interval has elapsed since the moment of the change of the timer 50e from its off state to its on state, the timer 50e outputs a start signal to the main power supply control portion 66. The main power supply control portion 66 is changed from its sleep state (its off state) to its on state by the start signal outputted from the timer 50e. As a result, the power feed from the main power supply 60 via the main power supply control portion 66 is restarted, and the CPU 50a and the ROM 50b are activated so that the program starts again.

In this case, the step S20 determines that the present start is caused by a start signal from the timer 50e. Thus, the program advances from the step S20 to the step S140.

The step S140 transfers object-code data from the RAM 50d to the flash memory 50c. The step S140 writes the object-code data into the flash memory 50c. Thus, the step S140 saves the object-code data in the flash memory 50c. As previously mentioned, the step S100 changes the timer 50e from its off state to its on state in response to the off command, and then the step S110 changes the main power supply control portion 66 from its on state to its sleep state (its off state). After the predetermined time interval given by the timer 50e has elapsed since the moment of the change of the timer 50e from its off state to its on state, the step S140 is executed. Thus, the moment of the writing of the object-code data into the flash memory 50c (the moment of the transfer of the object-code data from the RAM 50d to the flash memory 50c) follows the moment of the occurrence of the off command by a time interval substantially equal to the predetermined time interval given by the timer 50e.

Before the step S140 is executed, the main power supply control portion 66 is changed from its sleep state (its off state) to its on state by the start signal from the timer 50e so that the power feed from the main power supply 60 via the main power supply control portion 66 is restarted. The power feed from the main power supply 60 replaces the power feed from the auxiliary power supply 48 in activating the RAM 50d.

The step S150 which follows the step S140 clears all data from the RAM 50d. In addition, the step S150 changes the timer 50e from its on state to its off state.

The step S160 which is subsequent to the step S150 changes the RAM switch 68 from its on state to its off state. When the RAM switch 68 is changed to its off state, the power feed from the auxiliary power supply 48 to the RAM 50d is inhibited. After the step S160, the step S110 is executed. The step S110 changes the main power supply control portion 66 from its on state to its sleep state (its off state). Accordingly, the power feed from the main power supply 60 is interrupted or cut off. In this way, both the power feed to the RAM 50d from the auxiliary power supply 48 and the power feed to the RAM 50d from the main power supply 60 are cut off.

As previously mentioned, the moment of the writing of the object-code data into the flash memory 50c (the moment of the transfer of the object-code data from the RAM 50d to the flash memory 50c) follows the moment of the occurrence of the off command by a time interval substantially equal to the predetermined time interval given by the timer 50e. In the case where the user inputs an on command again via the power supply switch 62 before the predetermined time interval given by the timer 50e has elapsed, the program advances from the step S20 to the step S30 rather than the step S140. Thus, in this case, the writing of the object-code data into the flash memory 50c is prevented. Accordingly, it is possible to reduce the number of times object-code data are written into the flash memory 50c.

As previously mentioned, before the step S140 is executed, the main power supply control portion 66 is changed from its sleep state (its off state) to its on state by the start signal from the timer 50e so that the power feed from the main power supply 60 via the main power supply control portion 66 is restarted. The power feed from the main power supply 60 replaces the power feed from the auxiliary power supply 48 in activating the RAM 50d. Accordingly, the auxiliary power supply 48 can be small in capacity and size. The auxiliary power supply 48 may include a secondary battery or a chargeable circuit having a capacitor.

Mode ③ (Turning on Main Power Supply after Data Save)

In the case where the user inputs an on command via the power supply switch 62 after the data saving process has been completed in the operation mode ②, the program is restarted and the step S20 is executed. The step S20 determines that the present start is not caused by a start signal from the timer 50e. Therefore, the program advances from the step S20 to the step S30.

Since the step S150 in the data saving process (the operation mode ②) has cleared all the data from the RAM 50d, the step S30 determines that data recovered from an object code are not in the RAM 50d. Therefore, the program advances from the step S30 to the step S40.

Since the step S140 in the data saving process (the operation mode ②) has written the object-code data into the flash memory 50c, the step S40 determines that data recovered from an object code are in the flash memory 50c. Therefore, the program advances from the step S40 to the step S50.

The step S50 transfers the object-code data from the flash memory 50c to the RAM 50d. The step S50 writes the object-code data into the RAM 50d again. In addition, the step S50 clears the object-code data from the flash memory 50c.

The step S60 which follows the step S50 changes the timer 50e from its on state to its off state. After the step S60, the program advances to the step S70.

As understood from the above explanation, the step S50 returns the optical information reading apparatus to the previous condition in which the object-code data are stored in the RAM 50d. Accordingly, during a later stage, the RAM 50d is accessed while an access to the flash memory 50c is avoided. Thus, it is possible to reduce the number of times object-code data are written into the flash memory 50c.

Also, in the case where the step S260 has transmitted the object-code data from the RAM 50d to the host apparatus and the step S270 has cleared the object-code data from the RAM 50*d* during the information reading and data outputting process (the operation mode ①), the program advances to the step S40 via the step S30.

The step S40 determines whether or not data recovered from an object code are in the flash memory 50*c*. When it is determined that object-code data are in the flash memory 50*c*, the program advances from the step S40 to the step S50. On the other hand, it is determined that object-code data are not in the flash memory 50*c*, the program advances from the step S40 to the step S120.

The step S120 determines whether or not object-code data have been transmitted to the host apparatus. When it is determined that object-code data have been transmitted to the host apparatus, the optical information reading apparatus is decided to be normally operating and the program advances from the step S120 to the step S70 to maintain the normal operation. On the other hand, in the case where object-code data are in neither the RAM 50*d* nor the flash memory 50*c* and the step S120 determines that object-code data have not been transmitted to the host apparatus, the optical information reading apparatus is decided to be abnormally operating. In this abnormal case, the program advances from the step S120 to the step S130 which implements the process of informing the user that an abnormal condition occurs. Then, the step S110 cuts off the power feed from the main power supply 60, and the execution of the program ends.

It should be noted that only the auxiliary power supply 48 may correspond to a second power supply.

What is claimed is:

1. An optical information reading apparatus of a portable type, comprising:

reading means for reading optical information and converting the optical information into electric information;

volatile memory means for storing the electric information generated by the reading means;

nonvolatile memory means;

a first power supply for feeding electric power to at least the reading means and the volatile memory means;

a second power supply;

first changing means for replacing the first power supply by the second power supply and enabling the second power supply to feed electric power to at least the volatile memory means instead of the first power supply in cases where electric power feed by the first power supply is required to be cut off;

writing means for transferring the electric information from the volatile memory means to the nonvolatile memory means, and writing the electric information into the nonvolatile memory means when a predetermined time has elapsed since a moment at which the electric power feed by the first power supply is required to be cut off; and second changing means for replacing the second power supply by the first power supply and enabling the first power supply to feed electric power to at least the volatile memory means instead of the second power supply before the writing means transfers the electric information from the volatile memory means to the nonvolatile memory means and writes the electric information into the nonvolatile memory means, and wherein the first power supply feeds electric power to the writing means and the nonvolatile memory means.

2. An optical information reading apparatus as recited in claim 1, further comprising means for inhibiting electric power feed by the second power supply after the writing means transfers the electric information from the volatile memory means to the nonvolatile memory means and writes the electric information into the nonvolatile memory means.

3. An optical information reading apparatus as recited in claim 1, further comprising means for transferring the electric information from the nonvolatile memory means to the volatile memory means in cases where power feed by the first power supply is restarted after the writing means transfers the electric information from the volatile memory means to the nonvolatile memory means and writes the electric information into the nonvolatile memory means.

4. An optical information reading apparatus as recited in claim 1, wherein the second changing means comprises timer means for measuring a lapse of time from the moment at which the electric power feed by the first power supply is required to be cut off, and returning means for replacing the second power supply by the first power supply and enabling the first power supply to feed electric power to at least the volatile memory means instead of the second power supply when the lapse of time which is measured by the timer means reaches a given time.

5. An optical information reading apparatus as recited in claim 1, further comprising cut-off means for cutting off the feed of electric power from the first power supply to at least the volatile memory means when the writing means completes transferring eh electric information from the volatile memory means to the nonvolatile memory means and writing the electric information into the nonvolatile memory means.

6. An optical information reading apparatus of a portable type, comprising:

a volatile memory;

a nonvolatile memory;

a main power supply;

an auxiliary power supply;

first means for enabling the main power supply to activate the volatile memory;

second means for storing data into the volatile memory;

third means for enabling the auxiliary power supply to activate the volatile memory instead of the main power supply when activation of the volatile memory by the main power supply is required to be suspended;

fourth means for enabling the main power supply to activate the volatile memory instead of the auxiliary power supply when a predetermined time has elapsed since a moment at which the third means enables the auxiliary power supply to activate the volatile memory instead of the main power supply; and fifth means for preventing transfer of the data from the volatile memory to the nonvolatile memory before the fourth means enables the main power supply to activate the volatile memory instead of the auxiliary power supply and transferring the data from the volatile memory to the nonvolatile memory when the fourth means fails to enable the main power supply to activate the volatile memory instead of the auxiliary power supply.

7. An optical information reading apparatus of a portable type, comprising:

reading means for reading optical information and converting the optical information into electric information;

volatile memory means for storing the electric information generated by the reading means;

nonvolatile memory means;

a first power supply for feeding electric power to at least the reading means and the volatile memory means;

a second power supply;

changing means for replacing the first power supply by the second power supply and enabling the second power supply to feed electric power to at least the volatile memory means instead of the first power supply in cases where electric power feed by the first power supply is required to be cut off; and writing means for transferring the electric information from the volatile memory means to the nonvolatile memory means, and writing the electric information into the nonvolatile memory means after a predetermined time has elapsed since a moment at which the electric power feed by the first power supply is required to be cut off;

wherein the changing means replaces the second power supply by the first power supply and enables the first power supply to feed electric power to at least the volatile memory means instead of the second power supply, and stops the writing means from transferring the electric information from the volatile memory means to the nonvolatile memory means and writing the electric information into the nonvolatile memory means when the predetermined time has not lapsed, and wherein the first power supply feeds electric power to the writing means and the nonvolatile memory means.

* * * * *